United States Patent Office 3,500,919
Patented Mar. 17, 1970

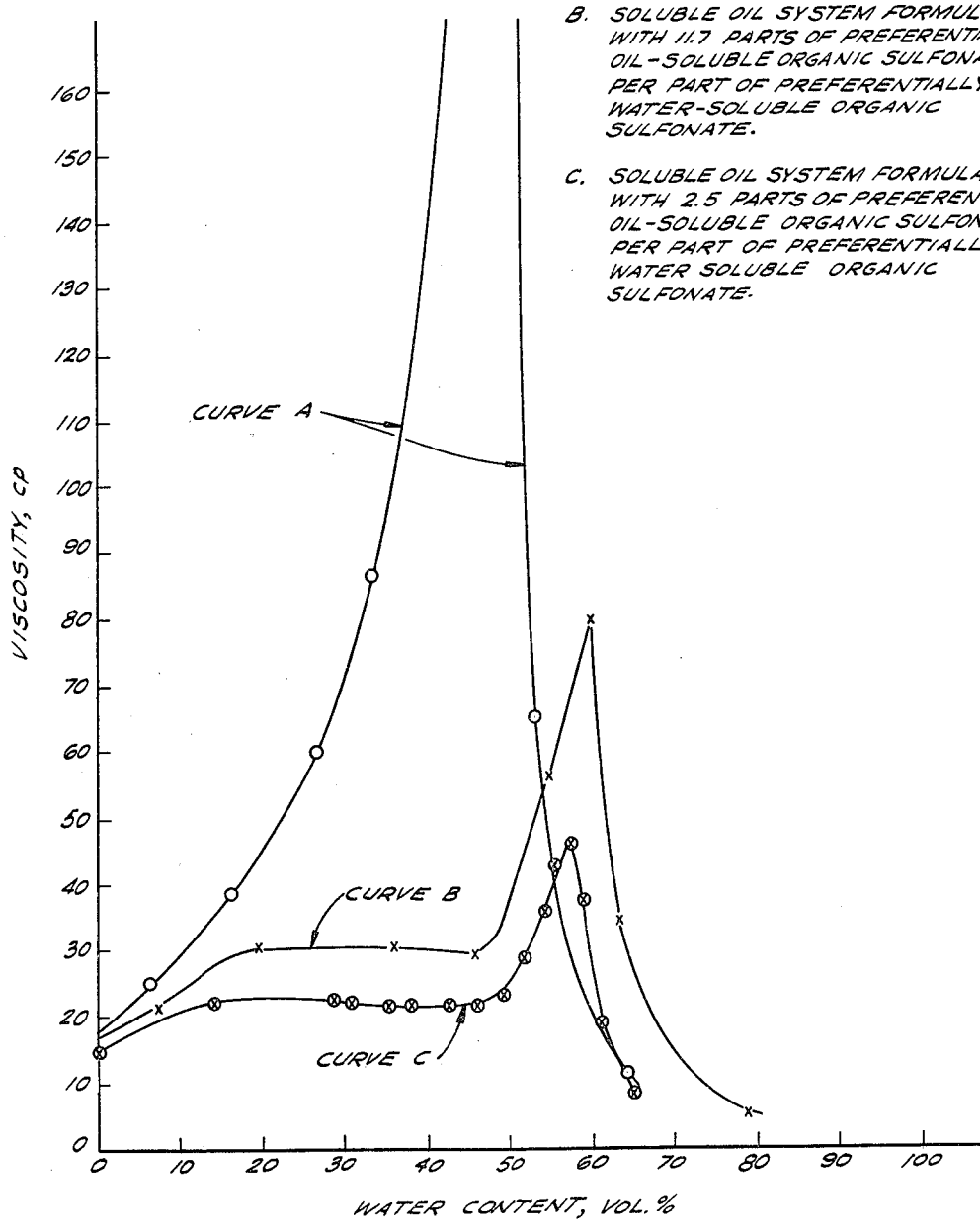

3,500,919
MISCIBLE FLOODING PROCESS USING IMPROVED SOLUBLE OIL COMPOSITIONS
Le Roy W. Holm, Fullerton, Calif., assignor to Union Oil Company of California, Los Angeles, Calif., a corporation of California
Filed Mar. 15, 1968, Ser. No. 713,496
Int. Cl. E21b *43/16*
U.S. Cl. 166—273          24 Claims

ABSTRACT OF THE DISCLOSURE

A miscible flooding process for the recovery of oil from subterranean reservoirs in which an improved soluble oil composition comprising a liquid hydrocarbon, a preferentially oil-soluble organic sulfonate, a preferentially water-soluble organic sulfonate, and a stabilizing agent is injected into the reservoir through an injection well, and thereafter an aqueous flooding agent is injected to drive the soluble oil composition towards a spaced production well. The soluble oil can be injected as a substantially anhydrous liquid or as a water-in-oil microemulsion.

---

This invention relates to the recovery of oil from subterranean petroleum reservoirs, and more particularly to an improved miscible flooding process for the recovery of petroleum.

It has long been recognized that substantial amounts of oil remain unrecovered in the reservoir at the completion of noral primary recovery operations. Hence, various secondary methods of recovering additional quantities of oil have been proposed, such as the well-known technique of water flooding in which water is injected into the reservoir through an injection well to drive additional oil toward one or more production wells spaced apart in the reservoir from the injection well. Although an additional quantity of oil can often be recovered by waterflooding, the efficiency of the water flood and the ultimate oil recovery can be further improved by introducing a solvent that is miscible with both the connate oil and with the flood water into the reservoir ahead of the flood water.

One particular solvent system that has been suggested for use with a water drive coprises a mixture of substantially anhydrous soluble oil and an inert, nonaqueous solvent, preferably admixed in such proportions that the viscosity of the mixture approximates the viscosity of the formation oil. The soluble oil consists of a hydrocarbon phase; one or more soaps or non-soap surface active materials; and a stabilizing agent which is usually a monohydric or polyhydric alcohol, or other partially oxygenated, low molecular weight hydrocarbon, such as a ketone. The soluble oil often contains some free organic acid, and especially a fatty acid, such as oleic acid.

It has also been proposed that the flood water be preceded by a microemulsion consisting of a soluble oil containing substantial quantities of water, such as from about 10 to 50 percent or more water. These microemulsions are relatively stable, transparent emulsions of the water-in-oil type, i.e., oil is the continuous phase and extremely small droplets of water are dispersed therein.

It is well known that soluble oils spontaneously absorb or "take up" water when contacted therewith forming water-in-oil microemulsions, and that the viscosity of the soluble oil increases sharply as it takes up water. Water take up by the soluble oil can occur both on the addition of water to the soluble oil prior to injection into the formation and on the injected soluble oil contacting water in the reservoir. Not only is difficulty experienced on injecting these high viscosity soluble oils and microemulsions into the reservoir, but more seriously, unfavorable mobility ratios exist in the reservoir between the viscous miscible displacement fluid and subsequently injected flood water causing excessive fingering of the drive fluid into the more viscous miscible displacement fluid.

Although various types of hydrocarbons have been suggested for the preparation of soluble oils, in most applications, both where the soluble oil is injected in the anhydrous form and as a microemulsion, economics favor preparation of the soluble oil from a petroleum crude oil, which can be a crude oil previously produced from the reservoir to be treated, or which is otherwise conveniently available, or from other relatively viscous hydrocarbon fractions. However, the problem of viscosity increase on water take up is particularly acute with these more viscous hydrocarbons and it has heretofore been necessary to use more costly, lower boiling hydrocarbons, such as gasoline and LPG, as the hydrocarbon base in the preparation of the soluble oils and microemulsions useful as miscible displacement fluids, or to dilute the more viscous soluble oils and microemulsions with expensive solvents. Thus, need exists for an economical miscible solvent system that has a mobility approximating the mobility of the reservoir oil, that does not greatly decrease in mobility on water take up, and that effects high oil recovery when followed by a water drive.

Accordingly, it is a principal object of this invention to provide an improved miscible flooding process for the recovery of petroleum from subterranean reservoirs. Another object of the invention is to provide a miscible flooding process in which an improved miscible displacement fluid is injected into an oil-containing reservoir and is thereafter driven through the reservoir by flood water. Yet another object of the invention is to provide a miscible displacement process for the recovery of petroleum in which the miscible displacement fluid is a soluble oil having a limited viscosity increase on taking up water. Still another object of the invention is to provide a method for limiting the viscosity increase imparted to a soluble oil by the addition of water. A further object of the invention is to provide a soluble oil composition in which the viscosity is not greatly effected by the addition of water to the soluble oil. Other objects and advantages will be apparent from the following description.

Briefly, this invention contemplates a process for recovering petroleum from subterranean oil-bearing reservoirs in which a soluble oil composition comprising a liquid hydrocarbon, a preferentially oil-soluble organic sulfonate, a preferentially water-soluble organic sulfonate, and a stabilizing agent is injected into the reservoir through an injection well and thereafter an aqueous flooding agent is injected to drive the soluble oil composition towards a spaced production well from which fluids are recovered. The soluble oil can be injected into the reservoir as an anhydrous liquid, or it can be injected as a water-in-oil microemulsion. In either case, it has been found that soluble oils compounded in accordance with this invention are less affected by the addition of water than are the prior art soluble oils, that more water can be absorbed before inversion to oil-in-water emulsions, and that improved oil recovery is attained when the soluble oils are used in a miscible flooding process.

The figure graphically illustrates the variation in viscosity of a conventional soluble oil system and of soluble oil systems of the present invention as a function of water content.

More specifically, this invention involves a miscible flooding process in which oil is displaced from a subterranean oil-bearing reservoir by an improved soluble oil composition containing a mixture of surface active materials including both preferentially oil-soluble organic sulfonates and preferentially water-soluble organic sulfonates. In the practice of this invention, a slug of the improved soluble oil composition in the form of a substantially anhydrous liquid or a water-in-oil microemulsion is injected into the reservoir through one or more injection or input wells penetrating the oil-bearing formation and forced through the reservoir by subsequently injected flood water toward at least one production or output well similarly completed in the reservoir. As the miscible flooding medium passes through the reservoir, it displaces residual oil therein and moves it into the producing well whereupon the oil can be recovered by conventional means. The injection and production wells can be arranged in any convenient pattern designed to achieve maximum contact of the oil-bearing zones by the advancing flood front, such as the conventional "five-spot" pattern wherein a central producing well is surrounded by four somewhat symmetrically located injection wells. Another of the conventional flooding patterns that can be employed in the practice of this invention is the "line drive" pattern in which the injection wells are arranged in a line so that the injected flooding medium advances through the formation to displace oil toward one or more spaced production wells that can also be arranged in a line substantially parallel to the line of injection wells.

The soluble oils used herein are oleaginous compositions which have the ability to spontaneously emulsify with water when admixed therewith. These soluble oils comprise a liquid hydrocarbon, a preferentially oil-soluble organic sulfonate, a preferentially water-soluble organic sulfonate, and a stabilizing agent. The emulsions formed by the addition of water to a soluble oil are of the water-in-oil type in that, at water concentrations less than the inversion concentration, oil is the continuous phase and the water is dispersed in the oil in the form of very fine droplets, or micelles, which are less than about 0.1 micron in size, and usually range in size from about 100 to 600 A. These emulsions are generally transparent in appearance, and are stable in that they remain as microemulsions on aging. By transparent, it is meant that the microemulsions do not have a cloudy or opaque appearance, even though they may contain color bodies. It is recognized, of course, that some cloudiness may appear at certain water concentrations without adversely effecting the utility of the microemulsion as a miscible displacement agent. Emulsions of this type are designated microemulsions to distinguish them from ordinary water-in-oil microemulsions in which the lower limit of the size of the water droplets is about 0.1 micron. At water concentrations above the inversion concentration, the emulsion inverts to an oil-in-water emulsion in which droplets of oil are dispersed in a continuous water phase. It is preferred that the water concentrations of the soluble oils of this invention be maintained below the inversion concentration so as to prevent inversion to emulsions of the oil-in-water type.

One of the major constituents of the improved soluble oil composition of this invention is a liquid hydrocarbon, which can comprise a crude petroleum oil, such as a crude oil previously recovered from the reservoir, or other conveniently available crude oil; a refined or semi-refined petroleum product, such as gasoline, naphtha, stove oil and diesel; a residual product obtained by the distillation of lower boiling fractions from a crude oil, such as bunker fuel oil and other residual products; a lower value refinery by-product, such as catalytic cycle oil, lube oil extract, and the like; and liquefied normally gaseous hydrocarbons, such as propane, butane and LPG. While soluble oils can be prepared from any of these hydrocarbons, or mixtures of different hydrocarbons, in many miscible flooding operations it is preferred to use a soluble oil compounded with petroleum crude oil, such as crude oil previously recovered from the reservoir, or with other conveniently available crude oil.

The preferentially oil-soluble surfactant material is an oil-soluble, relatively water-insoluble organic sulfonate that exhibits substantially greater solubility in oil than in water. Some of the preferentially oil-soluble organic sulfonates useful in the practice of this invention are almost completely insoluble in water, while others exhibit limited water solubility, particularly at elevated temperatures. Even though the preferentially oil-soluble organic sulfonate may exhibit some water solubility, they are nevertheless characterized by markedly greater solubility in oil. The preferentially water-soluble surfactant material is a water-soluble, relatively oil-insoluble organic sulfonate that exhibits substantially greater solubility in water than in oil. Some of these preferentially water-soluble organic sulfonates are almost completely insoluble in oil, while others exhibit limited oil solubility, particularly at elevated temperatures. Even though the preferentially water-soluble organic sulfonates may exhibit some oil solubility, they are nevertheless characterized by markedly greater solubility in water.

One class of preferentially oil-soluble organic sulfonate particularly useful in the practice of this invention are oil-soluble alkyl aryl sulfonates that contain only one sulfonic group attached to an alkyl aryl hydrocarbon. The preferentially oil-soluble alkyl aryl sulfonates are those which in the form of their sodium salts have molecular weights of more than about 400. Among the preferred preferentially oil-soluble organic sulfonates are alkyl sodium benzene sulfonates and alkyl sodium polyaryl sulfonates having molecular weights of more than about 400. The preferred preferentially water-soluble organic sulfonates include water-soluble alkyl aryl sulfonates. The water-soluble alkyl aryl sulfonates are generally those which in the form of their sodium salts have molecular weights of less than about 400 or which contain more than one sulfonic acid group per molecule. It has been found that in soluble oils compounded from petroleum crude oil or other high boiling hydrocarbons, superior results are obtained by employing as the preferentially oil-soluble organic sulfonate an alkyl aryl sulfonate which in the form of its sodium salt has a molecular weight above about 450, and preferably in the range of about 450 to 550.

Thus, the soluble oil compositions of this invention are prepared by admixing into the hydrocarbon a preferentially oil-soluble organic sulfonate, such as an alkyl aryl sulfonate or mixture of sulfonates which in the form of their sodium salts have molecular weights of more than about 400, and a preferentially water-soluble organic sulfonate, such as an alkyl aryl sulfonate or mixture of sulfonates which in the form of their sodium salts have molecular weights of less than about 400 or which are polysulfonates. Alternatively, a mixture of preferentially water-soluble and preferentially oil-soluble sulfonates can be employed, such as a mixture of alkyl aryl sulfonates which in the form of the sodium salt have an average molecular weight in the range of about 400 to 500.

The preferentially oil-soluble alkyl aryl sulfonates and preferentially water-soluble alkyl aryl sulfonates useful in the practice of this invention can be prepared by sulfonating an appropriate alkyl aryl hydrocarbon or mixture of hydrocarbons. Thus, a preferred preferentially oil-soluble alkyl aryl sulfonate can be prepared by sulfonating an alkyl aryl hydrocarbon to yield an alkyl aryl sulfonate which in the form of its sodium salt has a molecular weight of more than about 400. The preferred preferentially water-soluble alkyl aryl sulfonates are prepared by selecting the alkyl aryl hydrocarbon so that when sulfonated, the resulting alkyl aryl sulfonate in the form of its sodium salt has a molecular weight of less than about 400, or by sulfonating sufficiently to form the polysulfonates. These sulfonates are preferably in the form of the sodium salt, however other salts can be used.

A readily available source of alkyl aryl sulfonates are the natural petroleum sulfonates produced by sulfonating a relatively narrow boiling range mixture of petroleum hydrocarbons. Depending upon the boiling range of the hydrocarbon fraction, on sulfonation mixtures of alkyl aryl monosulfonates are produced which may be either preferentially water-soluble or preferentially oil-soluble. The term "natural petroleum sulfonates" is a commercial designation of petroleum sulfonates which are obtained by a treatment of petroleum fractions, particularly solvent treated aromatic fractions, with sulfuric acid, fuming sulfuric acid or sulfur trioxide. Upon sulfonation, two types of general products are formed which are designated mahogany acid sulfonates and green acid sulfonates. The terminology is based on the colors imparted to the sulfonates in solution, a brownish color being imparted to the sulfonates which remain in the oil and the greenish color imparted to aqueous solutions made from the acid sludges formed in the sulfonation process. The mahogany sulfonates are preferentially oil-soluble and the green sulfonates are preferentially water-soluble.

The mahogany sulfonates are alkyl aryl sulfonates which usually contain only one sulfonic group per molecule and both the green and the mahogany types contain mixtures of sulfonates of varying molecular weights with the mahogany, or oil-soluble sulfonates generally containing the sulfonates of higher molecular weights. The green sulfonates, or water-soluble sulfonates, contain the sulfonates of lower molecular weight or those containing more than one sulfonate group per molecule.

The preferentially oil-soluble surface active material and the preferentially water-soluble surface active material are employed in the proportions of about 1 part of preferentially oil-soluble agent per part of water-soluble agent to about 12 parts of oil-soluble agent per part of water soluble agent. Although the optimum surfactant combination is dependent upon the characteristics of the particular reservoir, in many operations it is found that superior results are obtained with a surfactant combination containing about 1 to 4 parts of preferentially oil-soluble surface active material per part of preferentially water-soluble surface active material; and more particularly, with a surfactant mixture containing about 2 parts of preferentially oil-soluble agent per part of preferentially water-soluble agent.

The various stabilizing agents that are admixed with the soluble oil to improve the properties and stability of the resulting microemulsions formed by admixing the soluble oil with water include partially oxygenated hydrocarbons such as monohydric and polyhydric alcohols, ketones, ethers and polyhydric alkyl ethers. Specific agents found particularly useful include isopropyl alcohol, secondary butyl alcohol, methyl ethyl ketone, glycol monoethyl ether, (Cellosolve), glycol monobutyl ether (butyl Cellosolve), and diethylene glycol monobutyl ether (butyl Carbitol).

It has been found that increased quantities of oil can be recovered from a subterranean petroleum reservoir by a miscible flooding process utilizing a soluble oil containing both preferentially oil-soluble and preferentially water-soluble surface active materials than can be recovered by either conventional water flooding or by miscible water flooding with the prior art soluble oils formulated with oil-soluble organic sulfonates, or other conventional surface active materials. Also, the soluble oil compositions of this invention do not exhibit the large increase in viscosity on taking up water that are characteristic of the prior art soluble oil compositions. For example, with the soluble oil compositions of this invention, the peak viscosity at the inversion water concentration may be not more than 4 to 5 times the viscosity of the anhydrous soluble oil. In contrast, the viscosity increase may be in excess of 50 to 100 fold with the prior art soluble oils. A further unexpected advantage observed with the soluble compositions of this invention is that the inversion of the microemulsion from a water-in-oil emulsion to an oil-in-water emulsion occurs at a higher water content than experienced with the prior art soluble oils. Thus, the soluble oils of this invention will take up more water prior to inversion than will the prior art soluble oils.

The soluble oils useful in the practice of this invention can be prepared by any of the conventional techniques. One suitable method is to prepare a substantially anhydrous soluble oil by admixing the hydrocarbon base stock, the stabilizing agent and the preferentially oil-soluble surface active material. Thereafter, the preferentially water-soluble surface active material is added. Water-in-oil microemulsions can be prepared by simply adding a desired amount of water to the substantially anhydrous soluble oil. Preferably, the water employed in forming the microemulsion is a salt-containing fresh water having a dissolved salt content of less than about 5000 p.p.m.

The preferred soluble oil compositions comprise 45 to 75 volume percent liquid hydrocarbon, 3 to 8 volume percent stabilizing agent, 8 to 30 volume percent combined surface active materials containing both preferentially oil and water-soluble organic sulfonate surface active materials in the previously disclosed proportions, and 0 to 40 percent water. Also, where the liquid hydrocarbon has a relatively high viscosity, an additional quantity of low viscosity, light liquid hydrocarbon can be added to increase the mobility of the resulting soluble oil to obtain a more favorable mobility ratio between the soluble oil and the following drive fluid. The light hydrocarbon will usually not constitute more than 25 percent by volume of the resulting soluble oil.

The soluble oil prepared in the foregoing manner is then injected into the reservoir through one or more injection wells in an amount sufficient to establish in the reservoir a miscible bank which can be displaced through the reservoir. Satisfactory oil recoveries can usually be obtained by the injection of 0.01 to 0.15 reservoir pore volumes of soluble oil. Aqueous flooding medium is then injected to displace the soluble oil toward at least one production well spaced apart in the reservoir, from which fluids are produced in conventional manner. The aqueous flooding medium can comprise water or brine, and can be made more viscous by the addition of a thickening agent such as sugar, dextran, carboxymethyl cellulose, amines, glycerine, guar gum and mixtures of these agents. Also, the aqueous flooding medium can be rendered more viscous by the addition of a small amount of a water-soluble polymer, such as a polyacrylamide, and particularly a partially hydrolyzed polyacrylamide. In a preferred method of practicing this invention, thickening agent is added to only an initial portion of the flood water. Thus, in this preferred embodiment, 0.01 to 0.15 reservoir pore volume of soluble oil is injected into the reservoir and followed by 0.1 to 0.5 reservoir pore volume of thickened aqueous flooding medium. Thereafter, water or brine is injected to drive the previously injected fluids, toward at least one spaced production well.

The invention is further illustrated by the following examples which are illustrative of specific modes of practicing the invention and are not intended as limiting the scope of the invention as defined by the appended claims.

EXAMPLE 1

The improved viscosity characteristic of the soluble oil composition of this invention is demonstrated by the following tests. A first substantially anhydrous soluble oil composition is prepared in accordance with the prior art by admixing 72 volume percent 39° API Illinois crude oil, 6.7 volume percent of butyl Cellosolve and 21.3 volume percent of a surface-active agent marketed by the Sonneborn Division of Witco Chemical Company, Inc. under the trademark Petronate CR. Petronate CR is an oil solution containing about 62 percent of preferentially oil-soluble alkyl aryl sulfonates having a molecular weight in the range of 490–510, and about 5 percent water. Tap water containing about 700 p.p.m. dissolved salts is then added to the soluble oil in incremental portions and the appearance of the resulting microemulsion is observed at each increment and its viscosity measured with a Brookfield viscosimeter equipped with a UL adapter and operated at a speed of 6 r.p.m. These data are reported in Table 1 and are illustrated in the drawing by curve A which shows the variation in viscosity as a function of water addition.

A second soluble oil composition in accordance with this invention is prepared by admixing 72.1 volume percent 39° API Illinois crude oil, 6.7 volume percent butyl Cellosolve, 18.3 volume percent Petronate CR, and 2.9 volume percent of a preferentially water-soluble surface-active agent marketed by the Sonneborn Division of Witco Chemical Company, Inc. under the trademark Pyronate 30. Pyronate 30 is an aqueous solution containing 30 percent preferentially water-soluble petroleum sulfonates having a molecular weight in the range of 330–350. The Pyronate 30 also contains 10 percent mineral oil and 10 percent inorganic salts. The ratio of preferentially oil-soluble active agent to preferentially water-soluble active agent is about 11.7 to 1. As before, water is incrementally added and the appearance and viscosity of the resulting microemulsion determined at each increment of water addition. These data are reported in Table 1 and are illustrated in the drawing by curve B.

A third soluble oil composition in accordance with this invention is prepared by admixing 70.9 volume percent Illinois crude oil, 6.6 volume percent butyl Cellosolve, 16.6 volume percent Petronate CR, and 5.9 volume percent Pyronate 30. The ratio of preferentially oil-soluble active agent to preferenitally water-soluble active agent is about 5.1 to 1. As before, water is incrementally added and the appearance and viscosity of the resulting microemulsion determined at each increment of water addition. These data are reported in Table 1 and are illustrated in the drawing by curve C.

It is apparent from this data that the soluble oil compounded with both oil and water-soluble organic sulfonate surface-active agents exhibits a markedly different viscosity relationship on taking up water than does the soluble oil compounded with a single surface-active agent. On the addition of water to the soluble oil compounded with a single surface-active agent, a water-in-oil microemulsion is formed. The viscosity of the microemulsion increased to a value in excess of 1200 cp., and the microemulsion is transformed into a gelatinous mass by the addition of about 49 percent water. On the continued addition of water, the microemulsion is inverted to an oil-in-water emulsion. Similarly, a water-in-oil microemulsion is formed on the addition of water to soluble oils containing both oil and water-soluble surface-active organic sulfonates. In the case of the soluble oil containing 11.7 parts of preferentially oil-soluble surface active sulfonate per part of preferentially water-soluble sulfonate, the viscosity of the resulting microemulsion is increased to a peak of 79 cp. at about 60 percent water addition, whereupon the microemulsion is inverted to an oil-in-water emulsion. The maximum viscosity at the inversion point is further reduced to 45.8 cp. with the soluble oil containing the more optimum ratio of 5.2 parts of preferentially oil-soluble sulfonate per part of preferentially water-soluble sulfonate. With the soluble oil compounded with a single surface-active agent, a viscosity of 79 cp. corresponds to a water content of about 30 percent and a viscosity of 45.6 cp. to about 20 percent water. Also, the water content at inversion is increased from about 49 percent water to about 60 percent. Another advantage of the soluble oils of this invention is that the viscosity increase is small up to about 50 percent water. Thus, compounding the soluable oil with the preferred combination of surface-active organic sulfonates results in a marked reduction in the maximum viscosity encountered on the addition of water and increases the amount of water that can be absorbed prior to inversion.

TABLE 1.—EFFECT OF WATER ON SOLUBLE OIL STABILITY AND VISCOSITY

[Soluble oil prepared with a single surfactant]

| Water content, percent | Viscosity, cp. | Emulsion type | Appearance |
|---|---|---|---|
| 0 | 18 | w/o | Clear. |
| 6.25 | 25 | w/o | Do. |
| 16.7 | 38 | w/o | Do. |
| 25 | 60 | w/o | Do. |
| 33.6 | 87 | w/o | Cloudy. |
| 38 | 1,200 | w/o | Thick. |
| 49 | Gel | | Do. |
| 53 | 65 | o/w | Cloudy. |
| 64 | 11 | o/w | Do. |

[Soluble oil prepared with a surfactant combination containing 11.7 parts of preferentially oil-soluble organic sulfonate per part of preferentially water-soluble organic sulfonate]

| Water content, percent | Viscosity, cp. | Emulsion type | Appearance |
|---|---|---|---|
| 0 | 17 | w/o | Clear. |
| 7.4 | 22 | w/o | Do. |
| 19.4 | 31 | w/o | Do. |
| 35.9 | 30 | w/o | Do. |
| 45.6 | 29 | w/o | Do. |
| 55 | 56 | w/o | Do. |
| 60 | 79 | | Do. |
| 63 | 34 | o/w | Cloudy. |
| 79 | 5 | o/w | Do. |

[Soluble oil prepared with a surfactant combination containing 5.2 parts of preferentially oil-soluble organic sulfonate per part of preferentially water-soluble organic sulfonate]

| Water content, percent | Viscosity, cp. | Emulsion type | Appearance |
|---|---|---|---|
| 0 | 14.9 | w/o | Clear. |
| 7.4 | 20.5 | w/o | Do. |
| 13.8 | 22.4 | w/o | Do. |
| 28.6 | 22.8 | w/o | Do. |
| 31.0 | 22.0 | w/o | Do. |
| 35.3 | 21.8 | w/o | Do. |
| 39.4 | 21.6 | w/o | Do. |
| 42.9 | 21.8 | w/o | Do. |
| 46.0 | 22.7 | w/o | Do. |
| 48.7 | 23.7 | w/o | Do. |
| 51.3 | 28.7 | w/o | Do. |
| 53.5 | 35.5 | w/o | Do. |
| 55.6 | 42.7 | w/o | Do. |
| 57.5 | 45.8 | | Do. |
| 59.2 | 37.5 | o/w | Cloudy. |
| 61.6 | 19.0 | o/w | Do. |
| 65.0 | 9.2 | o/w | Do. |

EXAMPLE 2

A number of substantially identical test cores 6 feet long by 1½ inches in diameter are prepared by packing Lucite tubes with Nevada 130 sand. The cores are first saturated with brine and then with an Illinois crude oil having a gravity of 39° API. The cores are then flooded with brine to residual oil saturation. The improved oil recovery obtainable with the soluble oil compositions of this invention is demonstrated by the following tests which simulate a tertiary recovery operation on an oil reservoir previously subjected to water flooding.

The recovery obtainable by miscible flooding with a prior art soluble oil composition is determined by injecting 0.025 pore volume of soluble oil in the form of a water-in-oil microemulsion into a first test core containing 29.3 percent residual oil. The microemulsion is prepared by admixing 69.2 volume percent Illinois crude oil, 6.4 volume percent butyl Cellosolve, 20.4 volume percent of preferentially oil-soluble surface-active agent marketed by the Sonneborn Division of Witco Chemical Company, Inc. under the trademark Petronate CR, and 4.0 volume percent tap water. Petronate CR is an oil solution containing about 62 percent of preferentially oil-soluble alkyl aryl sulfonates having a molecular weight in the range of 490–510 and about 5 percent water. The microemulsion is driven through the core by the injection of 0.40 pore volume of an aqueous flooding medium thickened by the addition of 0.2 weight percent of a partially hydrolyzed polyacrylamide marketed by the Dow Chemical Company under the trademark Pusher 500, and then by brine. The recovered oil is accumulated and its volume measured. The ultimate oil recovery is 83.8 percent of the residual oil-in-place exclusive of the amount of soluble oil injected.

A second core containing 28.0 percent residual oil is similarly treated with 0.025 pore volume of a microemulsion composition in accordance with this invention prepared by admixing 69.2 volume percent of 39° API Illinois crude oil, 6.4 volume percent butyl Cellosolve, 17.6 percent Petronate CR, 2.8 volume percent of a water-soluble surface-active agent marketed by the Sonneborn Division of Witco Chemical Company, Inc. under the trademark Pyronate 30, and 4.0 volume percent tap water. Pyronate 30 is an aqueous solution containing 30 percent perferentially water-soluble petroleum sulfonates having a molecular weight in the range of 330–350, 10 percent mineral oil and 10 percent inorganic salts. The ratio of preferentially oil-soluble surface-active agent to preferentially water-soluble agent is about 11.7 to 1. As before, the microemulsion is driven through the core by the injection of 0.40 pore volume of an aqueous flooding medium thickened by the addition of 0.2 weight percent of Pusher 500 and then by brine. The ultimate oil recovery is 84.5 percent of the residual oil-in-place, exclusive of the amount of soluble oil injected.

A third core containing 24.3 percent residual oil is treated with 0.025 pore volume of a more optimum microemulsion composition. This microemulsion is prepared by admixing 69.2 volume percent Illinois crude oil, 6.4 volume percent butyl Cellosolve, 11.7 volume percent Petronate CR, 8.7 volume percent Pyronate 30, and 4.0 volume percent tap water. The ratio of surface-active agents is about 2.5 parts of preferentially oil-soluble agent per part of preferentially water-soluble agent. The microemulsion is displaced through the core by the injection of 0.40 pore volume of an aqueous flooding medium thickened by the addition of 0.2 weight percent of Pusher 500, and then by brine. The ultimate oil recovery is 88.3 percent of the residual oil-in-place, exclusive of the amount of soluble oil injected.

Thus, it is apparent that oil recovery can be improved even in a tertiary recovery operation by miscible flooding with a soluble oil containing both substantially preferentially oil-soluble surface-active organic sulfonates, and preferentially water-soluble surface-active organic sulfonates. The results of these tests are summarized in Table 2.

viously recovered crude oil, 5 percent isopropyl alcohol, 10 percent gasoline, 10 percent preferentially oil-soluble alkyl aryl sulfonate, 5 percent preferentially water-soluble alkyl aryl sulfonate, and 20 percent water. The microemulsion is injected into each of the injection wells at injection rates of about 35 barrels per day until a total amount of microemulsion equivalent to about 0.10 reservoir pore volume is injected. Thereafter, aqueous flooding medium is injected into the reservoir through each of the injection wells and petroleum and other produced fluids are recovered from the central producing well.

EXAMPLE 4

A flooding operation similar to that described in Example 3 is conducted in which a substantially anhydrous soluble oil is injected into formation and driven therethrough by a subsequently injected aqueous flooding medium. The soluble oil is prepared by admixing 70 percent previously recovered crude oil, 7.0 percent butyl Cellosolve, and 23 percent of mixed alkyl aryl sulfonates having an average molecular weight of about 450 and containing both preferentially oil-soluble and preferentially water-soluble sulfonates.

Various embodiment and modifications of this invention have been described in the foregoing description and examples, and further modifications will be apparent to those skilled in the art. Such modifications are included within the scope of this invention as defined by the following claims.

Having now described the invention, I claim:

1. In the method of recovering petroleum from a subterranean reservoir in which a miscible displacement fluid miscible with both the connate reservoir oil and with water is injected into the reservoir through an injection well, and thereafter an aqueous flooding medium is injected to drive the miscible displacement fluid towards a spaced production well from which fluids are recovered, the improvement which comprises employing as the miscible displacement fluid a soluble oil comprising a liquid hydrocarbon, a partially oxygenated organic liquid stabilizing agent, a preferentially oil-soluble organic sulfonate surface active agent, and a preferentially water-soluble organic sulfonate surface active agent.

2. The method defined in claim 1 wherein said liquid hydrocarbon is crude petroleum.

TABLE 2

| Run No. | Microemulsion composition, volume percent | Ratio of oil-soluble/water-soluble surface-active agent | Microemulsion slug size pore volume | Initial core saturation | | Ultimate oil recovery percent oil-in-place |
|---|---|---|---|---|---|---|
| | | | | Percent oil | Percent water | |
| 1 | 69.2 Illinois crude oil, 6.4 butyl Cellosolve, 20.4 petronate CR, 4.0 water. | ---------------- | 0.025 | 29.3 | 70.7 | 83.8 |
| 2 | 69.2 Illinois crude oil, 6.4 butyl Cellosolve, 17.6 Petronate CR, 2.8 Pyronate 30, 4.0 water. | 11.7 | 0.025 | 28.0 | 72.0 | 84.5 |
| 3 | 69.2 Illinois crude oil, 6.4 butyl Cellosolve, 11.7 Petronate CR, 8.7 Pyronate 30, 4.0 water. | 2.5 | 0.025 | 24.3 | 75.6 | 88.0 |

EXAMPLE 3

A miscible flooding operation is conducted on an oil-containing reservoir in accordance with the method of this invention. Four injection wells are arranged in a rectangular pattern around a single centrally located production well. A miscible displacement fluid comprising a microemulsion prepared by admixing 50 percent pre- 3. The method defined in claim 2 wherein said crude petroleum is previously recovered from said reservoir.

4. The method defined in claim 2 wherein said miscible displacement fluid also contains an additional quantity of light liquid hydrocarbon to increase the mobility of the miscible displacement to obtain a more favorable mobility ratio between the soluble oil and the following aqueous flooding medium.

5. The method defined in claim 2 wherein said partially oxygenated organic liquid stabilizing agent is glycol monobutyl ether or secondary butyl alcohol.

6. The method defined in claim 1 wherein said soluble oil contains water present in the form of a water-in-oil micro-emulsion.

7. The method defined in claim 1 wherein between about 0.01 to 0.15 pore volumes of said miscible displacement fluid is injected into the reservoir.

8. The method defined in claim 1 wherein said preferentially oil-soluble organic sulfonate surface active agent is an alkyl aryl sulfonate that in the form of its sodium salt has a molecular weight greater than about 400.

9. The method defined in claim 1 wherein said preferentially water-soluble organic sulfonate is an alkyl aryl sulfonate that in the form of its sodium salt has a molecular weight of less than about 400, or an alkyl aryl polysulfonate.

10. The method defined in claim 1 wherein at least an initial portion of said aqueous flooding medium is increased in viscosity by the addition of a thickening agent.

11. The method defined in claim 1 wherein said miscible displacement fluid is comprised of from about 45 to 75 volume percent liquid hydrocarbon, 3 to 8 volume percent partially oxygenated organic liquid, 8 to 30 volume percent combined preferentially oil-soluble and preferentially water-soluble surface active sulfonates, and from 0 to 40 percent water.

12. The method defined in claim 1 wherein the organic sulfonates are present in the proportion of between about 1 to 12 parts of preferentially oil-soluble agent per part of preferentially water-soluble agent.

13. The method defined in claim 1 wherein said partially oxygenated organic liquid stabilizing agent is a monohydric or polyhydric alcohol, a ketone, an ether, or a polyhydric alkyl ether.

14. A method for recovering petroleum from a subterranean reservoir penetrated by an injection well and a production well spaced apart in the reservoir, which comprises:

injecting 0.01 to 0.15 reservoir pore volume of a soluble oil comprising a mixture of liquid hydrocarbon, a partially oxygenated organic liquid stabilizing agent, a mixture of preferentially oil-soluble surface active organic sulfonates and preferentially water-soluble surface active organic sulfonates, said surface active agents being present in the proportion of about 1 to 12 parts of preferentially oil-soluble sulfonate per part of said preferentially water-soluble sulfonate, and water present in the form of a water-in-oil microemulsion;

thereafter injecting an aqueous flooding medium to drive the soluble oil towards said production well; and recovering petroleum from said production well.

15. The method in accordance with claim 14 wherein said preferentially oil-soluble organic sulfonate is an alkyl aryl sulfonate which in the form of its sodium salt has a molecular weight in excess of about 400, and wherein said preferentially water-soluble organic sulfonate is an alkyl aryl sulfonate which in the form of its sodium salt has a molecular weight of less than about 400, or which is an alkyl aryl polysulfonate.

16. The method in accordance with claim 14 wherein said liquid hydrocarbon is petroleum crude oil and wherein said preferentially oil-soluble surface active organic sulfonate is an alkyl aryl sulfonate which in the form of its sodium salt has a molecular weight in the range of about 450 to 550.

17. The method defined in claim 16 wherein said partially oxygenated organic liquid stabilizing agent is glycol monobutyl ether or secondary butyl alcohol.

18. The method defined in claim 14 in which an additional quantity of light liquid hydrocarbon is added to the soluble oil to increase its mobility to obtain a more favorable mobility ratio between the soluble oil and the following aqueous flooding medium.

19. The method defined in claim 14 in which an initial portion of the aqueous flooding medium is increased in viscosity by the addition of a thickening agent.

20. The method defined in claim 14 wherein said soluble oil is comprised of from about 45 to 75 volume percent of said liquid hydrocarbon, 3 to 8 volume percent of said partially oxygenated organic liquid stabilizing agent, 8 to 30 volume percent of combined preferentially oil-soluble surface active organic sulfonates and preferentially water-soluble surface active organic sulfonates, and up to about 40 volume percent water.

21. A method for recovering petroleum from a subterranean reservoir penetrated by an injection well and a production well spaced apart in the reservoir, which comprises:

injecting 0.01 to 0.15 reservoir pore volume of a soluble oil comprising a mixture of 45 to 75 volume percent petroleum crude oil; 3 to 8 volume percent of a stabilizing agent selected from the group consisting of isopropyl alcohol, secondary butyl alcohol, methyl ethyl ketone, glycol monethyl ether, glycol monobutyl ether, and diethylene glycol monobutyl ether; and 8 to 30 volume percent of combined preferentially oil-soluble alkyl aryl sulfonate which in the form of its sodium salt has a molecular weight in the range of about 450 to 550, and a preferentially water-soluble alkyl aryl sulfonate which in the form of its sodium salt has a molecular weight of less than about 400, or which is an alkyl aryl polysulfonate, said surface active agents being present in the proportion of about 1 to 12 parts of preferentially oil-soluble sulfonate per part of said preferentially water-soluble sulfonate; and 0 to 40 parts of water, said water being present in the form of a water-in-oil microemulsion;

next injecting 0.1 to 0.5 reservoir pore volume of an aqueous flooding medium thickened by the addition of a minor proportion of a water-soluble polymer;

thereafter injecting a flood water to displace said previously injected fluids towards said production well; and recovering petroleum from said production well.

22. The method defined in claim 21 in which an additional quantity of light liquid hydrocarbon is added to the soluble oil to increase its mobility to obtain a more favorable mobility ratio between the soluble oil and the following thickened aqueous flooding medium.

23. In the method of recovering petroleum from a subterranean reservoir in which a miscible displacement fluid miscible with both the connate reservoir oil and with water is injected into the reservoir through an injection well, and thereafter an aqueous flooding medium is injected to drive the miscible displacement fluid towards a spaced production well from which fluids are recovered, the improvement which comprises employing as the miscible displacement fluid a soluble oil comprising a liquid hydrocarbon, a partially oxygenated organic liquid stabilizing agent, a preferentially oil-soluble organic sulfonate surface active agent, and a preferentially water-soluble organic sulfonate surface active agent, said soluble oil exhibiting a controlled low viscosity increase upon the addition of water thereto.

24. The method defined in claim 23, wherein said soluble oil exhibits a maximum viscosity upon the addition of water thereto not greater than about 5-fold higher than the viscosity of the substantially anhydrous soluble oil.

(References on following page)

References Cited

UNITED STATES PATENTS

| | | | |
|---|---|---|---|
| 3,126,952 | 3/1964 | Jones | 166—9 |
| 3,163,214 | 12/1964 | Csaszar | 166—9 |
| 3,254,714 | 6/1966 | Gogarty et al. | 166—9 |
| 3,261,399 | 7/1966 | Coppel | 166—9 |
| 3,288,213 | 11/1966 | King et al. | 166—9 |
| 3,324,944 | 6/1967 | Poettmann | 166—9 |
| 3,348,611 | 10/1967 | Reisberg | 166—9 |
| 3,406,754 | 10/1968 | Gogarty | 166—9 |

STEPHEN J. NOVOSAD, Primary Examiner

U.S. Cl. X.R.

166—274